Patented Aug. 7, 1951

2,562,944

UNITED STATES PATENT OFFICE 2,562,944

EMULSION POLYMERIZATION OF DIOLE-FINS IN THE PRESENCE OF SELECTED POLYMERIZATION REGULATORS

Charles H. Portser, Jr., Lancaster, Pa., assignor to Armstrong Cork Company, Lancaster, Pa., a corporation of Pennsylvania No Drawing. Application December 30, 1947, Serial No. 794,805

10 Claims. (Cl. 260—82.3)

This invention relates to the manufacture of synthetic rubber. More particularly, the invention relates to the production of synthetic rubber by the emulsion polymerization of an open chain aliphatic conjugated diolefine having 4 to 6 carbon atoms in the presence of a selected polymerization regulator capable of producing high yields of the desired polymer and also capable of imparting improved properties to the final product.

Synthetic rubbers have been produced in a number of ways, but probably the most widely employed is that involving the emulsion polymerization of diolefines, particularly open chain aliphatic conjugated diolefines having 4 to 6 carbon atoms either alone, to form homopolymers, or in the presence of vinyl compounds which are well-known to be copolymerizable with such diolefines in an aqueous emulsion. These rubber-forming polymerizable materials are well-known to the skilled workers in the art. However, by way of example, I mention such open chain aliphatic conjugated diolefines as butadiene, isoprene, piperylene, methyl pentadiene, dimethyl butadiene, and the like. Likewise, the copolymerizable vinyl compounds are well-known to those skilled in the art but, by way of example, I shall mention such vinyl compounds as aromatic olefines such as styrene, methylstyrene, and the like, and acrylic acid derivatives such as acrylonitrile and methacrylonitrile. Generally speaking, it is the practice in the production of synthetic rubbers from such monomeric materials to form an aqueous emulsion of the monomers and thereafter subject the resulting emulsion to slightly elevated temperatures which are known to the art and which may be such as 30° to 80° C. until the desired properties are obtained. The proportions of copolymerizable monomers employed in copolymerization are also well-known; generally speaking, 60% to 80% diolefine and 40% to 20% copolymerizable vinyl compound are present in the polymerizable mixture.

In order to improve the emulsion polymerization process, various polymerization regulators, polymerization catalysts, and "short-stopping" agents have been incorporated in the emulsion of polymerizable material. However, manufacturers are still faced with the problem of producing material of a rubberlike nature which is easily handled on conventional mixing rolls and other similar rubber compounding equipment. Many of the various additives which have been employed with a view toward improving one or more characteristics of the diolefine-type synthetic rubbers have given improved results in one or more of the desired properties while, at the same time, causing disadvantageous results in certain of the other desired properties.

I have found that diolefine-type synthetic rubbers may be produced in high yield and with an overall improvement in physical characteristics by employing a selected polymerization regulator mixture in an otherwise conventional emulsion polymerization process.

In accordance with my invention, I provide an emulsion of rubber-forming monomeric material which may be a diolefine of the type described above in the substantial absence of other polymerizable material, or which may be a mixture of such a diolefine with rubber-forming vinyl compounds of the type described above. To this mixture I add a selected polymerization regulator mixture. One of the components of my polymerization regulator mixture is a cyclic aldehyde, and by such a term I intend to include aromatic aldehydes such as benzaldehyde, tolualdehyde, annamaldehyde, salicylaldehyde, anisaldehyde, naphthaldehyde, anthraldehyde, and the like as well as heterocyclic aldehydes such as furfural and the like.

The other component of my polymerization regulator mixture is a carboxylic acid having 2 to 8 carbon atoms such as acetic, propionic, butyric, levulinic, and the like. I have obtained particularly advantageous results by employing hydroxy carboxylic acids such as glycollic acid, B-hydroxybutyric acid, malic acid, citric acid, tartaric acid, lactic acid, and the like and particularly monohydroxy monocarboxylic acids having from 2 to 3 carbon atoms.

The regulator mixture may be formed separately and then added to the emulsion of polymerizable material or each of the components may be added separately. In any event, both components of the mixture must be present prior to the application of elevated temperature to obtain the desired rubberlike polymer. The improved results obtained are due to some conjoint action between the components of my regulator mixture and are not merely an additive effect.

While the quantity of the components of my polymerization regulator mixture may be varied, generally speaking I have obtained advantageous results by the use of a polymerization regulator mixture containing from about 0.25% to about 1.0% of each component, said percentages being based upon the weight of the water present in the emulsion. In the mixture per se I may use about 20% to about 80% cyclic aldehyde and about 80% to about 20% carboxylic acid. Generally speaking, a mixture containing about two parts by weight of cyclic aldehyde and about one part by weight carboxylic acid is advantageously used.

My polymerization regulator may, of course, be employed in conjunction with conventional regulators, modifiers, and catalysts generally used in synthetic rubber manufacture by the emulsion polymerization technique. For instance, I may use a catalytic amount, such as 0.3%, of a catalyst, such as sodium perborate, potassium persulfate, and the like, in the aqueous emulsion.

My invention may be readily understood by reference to the following specific examples in which all parts are given by weight.

Example 1

A polymerizable mixture was formed containing the following ingredients in the following proportions:

|  | Parts |
| --- | --- |
| Distilled water | 14.4 |
| "Aquarex D" (sodium lauryl sulfate) | 0.76 |
| Sodium perborate | 0.04 |
| Acetic acid | Sufficient to give pH of 6.5 |
| Styrene | 2.24 |
| Benzaldehyde | 0.072 |
| Lactic acid | 0.036 |
| Dodecyl mercaptan | 0.048 |
| Butadiene | 5.76 |

This mixture was heated at a temperature of 50° C. for a period of seventeen hours to obtain a 70% yield of a rubberlike butadiene-styrene copolymer.

Example 2

In this example the polymerizable mixture contained the following ingredients in the following proportions:

|  | Parts |
| --- | --- |
| Distilled water | 14.4 |
| "Aquarex D" | 0.38 |
| Potassium persulfate | 0.024 |
| Acrylonitrile | 2.0 |
| Dodecyl mercaptan | 0.048 |
| Benzaldehyde | 0.072 |
| Lactic acid | 0.036 |
| Butadiene | 6.0 |

This polymerizable mixture was heated at a temperature of 50° C. for a period of eleven hours to obtain a 91% yield of a rubberlike copolymer having a tensile strength of 1550 pounds per square inch, a percent elongation of 410, and a percent elongation after storage for seventy hours at 212° F. of 320.

Example 3

The polymerizable mixture contained the following ingredients in the following proportions:

|  | Parts |
| --- | --- |
| Distilled water | 14.4 |
| "Aquarex D" | 0.38 |
| Acetic acid | 0.03 |
| Sodium perborate | 0.04 |
| Acrylonitrile | 2.0 |
| Dodecyl mercaptan | 0.048 |
| Furfural | 0.072 |
| Lactic acid | 0.036 |
| Butadiene | 6.0 |

This polymerized mixture was heated at 50° C. for 10.5 hours to obtain an 81% yield of a rubberlike copolymer having a tensile strength of 1675 pounds per square inch and a percent elongation of 420. After storage for seventy hours at 212° F., the percent elongation was 300.

Example 4

A polymerizable mixture was formed containing the following ingredients in the following proportions:

|  | Parts |
| --- | --- |
| Distilled water | 14.4 |
| "Aquarex D" | 0.38 |
| Acetic acid | 0.02 |
| Sodium perborate | 0.04 |
| Acrylonitrile | 2.0 |
| Dodecyl mercaptan | 0.048 |
| Benzaldehyde | 0.072 |
| Lactic acid | 0.036 |
| Butadiene | 6.0 |

This mixture was subjected to a temperature of 50° C. for a period of eleven hours to obtain an 85% yield of rubberlike copolymer having a tensile strength of 1750 pounds per square inch and a percent elongation of 310. The material was stored for seventy hours at 212° F., after which it exhibited a percent elongation of 240.

Example 5

A polymerizable mixture was formed from the following ingredients in the following proportions:

|  | Parts |
| --- | --- |
| Distilled water | 14.4 |
| "Aquarex D" | 0.38 |
| Acetic acid | 0.02 |
| Sodium perborate | 0.04 |
| Acrylonitrile | 2.0 |
| Dodecyl mercaptan | 0.048 |
| Benzaldehyde | 0.144 |
| Butadiene | 6.0 |

This mixture was subjected to a temperature of 50° C. for a period of eleven hours to obtain an 80% yield of rubberlike copolymer having a tensile strength of 1960 pounds per square inch and a percent elongation of 385. The material was stored for seventy hours at 212° F. and thereafter had a percent elongation of 265.

Example 6

A polymerizable mixture was formed containing the following ingredients in the following proportions:

|  | Parts |
| --- | --- |
| Distilled water | 14.4 |
| "Aquarex D" | 0.38 |
| Potassium persulfate | 0.024 |
| Acrylonitrile | 2.0 |
| Dodecyl mercaptan | 0.048 |
| Benzaldehyde | 0.036 |
| Lactic acid | 0.044 |
| Butadiene | 6.0 |

This mixture was subjected to a temperature of 50° C. for a period of twelve hours to obtain an 82% yield of a rubberlike butadiene-acrylonitrile copolymer having a tensile strength of 1500 pounds per square inch and a percent elongation of 370. The material was stored for seventy hours at 212° F., after which it exhibited a percent elongation of 290.

The above examples are given merely by way of illustration of the practice of my invention and are in no sense to be considered limiting. The materials produced utilizing the polymerization regulator mixture to which my invention is particularly directed are readily processed and may be readily extruded. The polymerization regulator mixture may be employed in the production of diolefine containing synthetic rubber by emulsion polymerization technique. As pointed out above, the emulsion may contain open chain aliphatic conjugated diolefines having 4 to 6 carbon atoms either alone or in the presence of the well-known vinyl compound rubber formers. The polymerization regulator is advantageously employed in the production of butadiene-acrylonitrile synthetic rubbers.

While my invention has been described with reference to certain particular examples and with reference to certain particular embodiments, it is to be understood that my invention is not limited thereby. Therefore, changes, omissions, substitutions, and/or additions may be made without departing from the spirit of the invention as defined in the appended claims which are intended to be limited only as required by the prior art.

I claim:

1. A method of making synthetic rubber comprising copolymerizing an open chain aliphatic conjugated diolefine having 4 to 6 carbon atoms with a vinyl compound copolymerizable therewith and of the group consisting of styrene, methyl styrene, and acrylonitrile in an aqueous emulsion in the presence of an aromatic aldehyde and a hydroxy carboxylic acid having 2 to 8 carbon atoms.

2. A method of making synthetic rubber comprising copolymerizing an open chain aliphatic conjugated diolefine with a vinyl compound copolymerizable therewith and of the group consisting of styrene, methyl styrene, and acrylonitrile in an aqueous emulsion in the presence of an aromatic aldehyde and a hydroxy carboxylic acid having 2 to 3 carbon atoms.

3. In the production of synthetic rubber by the emulsion polymerization of butadiene and styrene, the improvement comprising providing in said emulsion a polymerization regulator including a cyclic aldehyde and a hydroxy carboxylic acid having 2 to 8 carbon atoms.

4. In the production of synthetic rubber by the emulsion polymerization of butadiene and acrylonitrile, the improvement comprising providing in said emulsion a polymerization regulator including a cyclic aldehyde and a hydroxy carboxylic acid having 2 to 8 carbon atoms.

5. A method of making synthetic rubber comprising copolymerizing butadiene with styrene in an aqueous emulsion containing benzaldehyde and lactic acid.

6. A method of making synthetic rubber comprising copolymerizing butadiene with acrylonitrile in an aqueous emulsion in the presence of a polymerization regulator containing benzaldehyde and lactic acid.

7. In the manufacture of synthetic rubber by the emulsion copolymerization of an open chain aliphatic conjugated diolefine with acrylonitrile, the improvement comprising providing in said emulsion a polymerization regulator containing a cyclic aldehyde and a hydroxy carboxylic acid having 2 to 8 carbon atoms.

8. In the manufacture of synthetic rubber by the emulsion copolymerization of an open chain aliphatic conjugated diolefine with styrene, the improvement comprising providing in said emulsion a polymerization regulator containing a cyclic aldehyde and a hydroxy carboxylic acid having 2 to 8 carbon atoms.

9. In the manufacture of synthetic rubber by the emulsion polymerization of an open chain aliphatic conjugated diolefine with a vinyl compound copolymerizable therewith and of the group consisting of styrene, methyl styrene, and acrylonitrile, the improvement comprising providing in said emulsion a polymerization regulator containing about 0.25% to about 1.0% based on the water content of said emulsion of a cyclic aldehyde and about 0.25% to about 1.0% based on the water content of said emulsion of a hydroxy carboxylic acid having 2 to 8 carbon atoms.

10. A method of producing a synthetic rubber comprising copolymerizing butadiene with acrylonitrile in an aqueous emulsion in the presence of a polymerization regulator mixture containing about 0.25% to about 1.0% by weight based on said monomeric material of benzaldehyde and also containing about 0.25% to about 1.0% by weight based on the water content of said emulsion of lactic acid.

CHARLES H. PORTSER, JR.

REFERENCES CITED

The following references are of record in the file of this patent:

UNITED STATES PATENTS

| Number | Name | Date |
|---|---|---|
| 2,118,863 | Reppe | May 31, 1938 |
| 2,386,661 | Clifford | Oct. 9, 1945 |
| 2,435,674 | Clifford | Feb. 10, 1948 |